No. 841,350. PATENTED JAN. 15, 1907.
R. STOCK.
BARREL VALVE AND TAPPING DEVICE.
APPLICATION FILED FEB. 16, 1906.
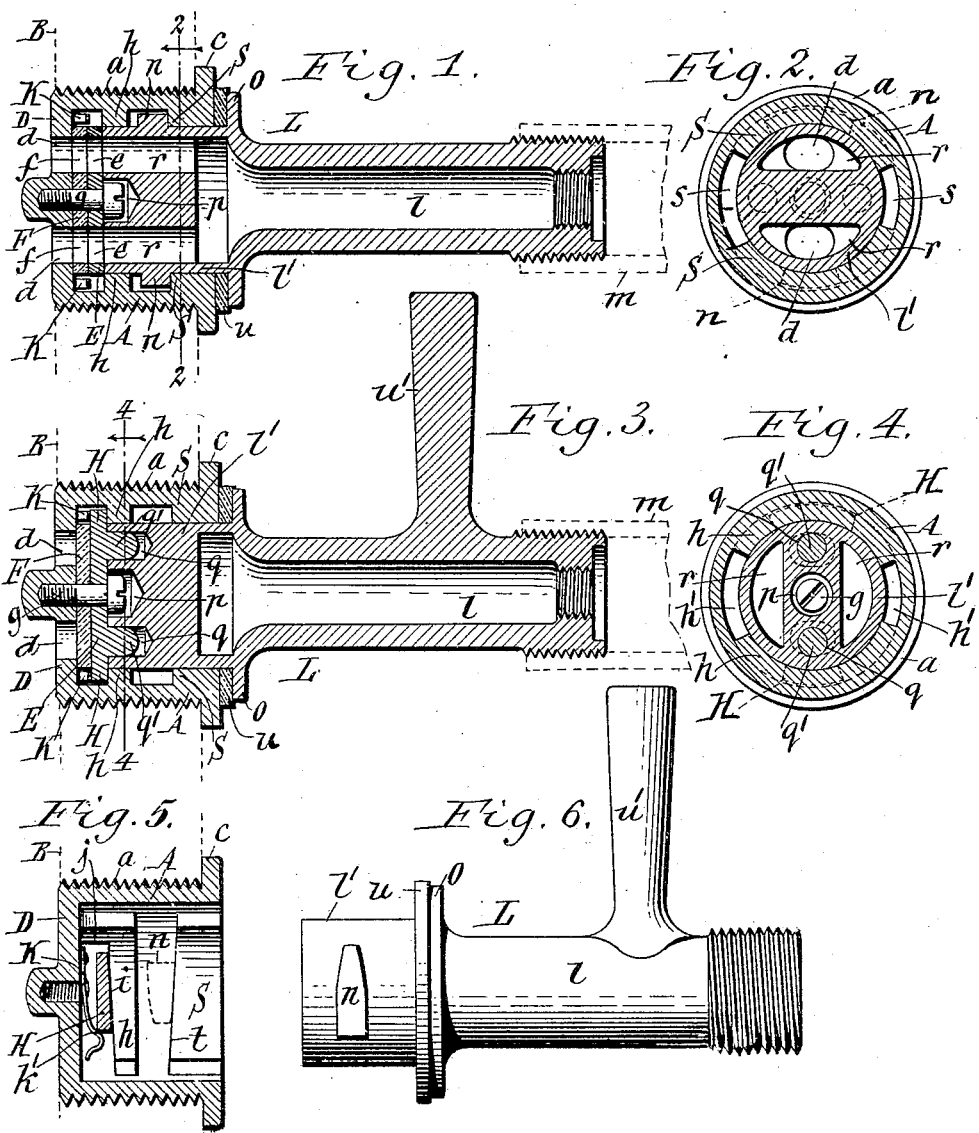
Robert Stock, Inventor
by Geyer & Popp
Attorneys.
Witnesses:

UNITED STATES PATENT OFFICE.

ROBERT STOCK, OF BUFFALO, NEW YORK, ASSIGNOR TO BUFFALO VALVE COMPANY, OF BUFFALO, NEW YORK, A CORPORATION OF NEW YORK.

BARREL VALVE AND TAPPING DEVICE.

No. 841,350.　　　　Specification of Letters Patent.　　　　Patented Jan. 15, 1907.

Application filed February 16, 1906. Serial No. 301,397.

*To all whom it may concern:*

Be it known that I, ROBERT STOCK, a citizen of the United States, residing at Buffalo, in the county of Erie and State of New York, have invented a new and useful Improvement in Barrel Valves and Tapping Devices, of which the following is a specification.

This invention relates to a valve and tapping device which is intended more particularly for use on beer-barrels for connecting the same with the conduit through which the beer is drawn off from the barrel.

The object of this invention is the production of a valve and tapping device of this character which is simple and durable in construction, which will securely close the liquid-passage, which can be readily repaired without taking the body of the valve out of the barrel, and which will permit of draining the entire contents from the barrel.

In the accompanying drawings, Figure 1 is a longitudinal section of my improved valve and tapping device, showing the valve in an open position and connected with the coupling attached to the delivery-conduit. Fig. 2 is a cross-section in line 2 2, Fig. 1. Fig. 3 is a view similar to Fig. 1, showing the valve in a closed position and the coupling shifted accordingly. Fig. 4 is a cross-section in line 4 4, Fig. 3. Fig. 5 is a longitudinal section of the valve-body, showing the means for tightening the valve-disk and also for locking the same yieldingly in its closed position. Fig. 6 is a side elevation of the coupling whereby the valve is coupled with a discharge-conduit.

Similar letters of reference indicate corresponding parts throughout the several views.

A represents the hollow body or casing of the valve, which is preferably constructed in the form of a cylindrical bushing, having an external screw-thread $a$, whereby the same is secured in an opening formed in the barrel B. (Shown by dotted lines in Figs. 1, 2, and 3.) At its outer end the valve-body is provided with an external annular flange $c$, which bears against the outer side of the barrel. The inner end of the valve-body when secured to the barrel is practically flush with the inner side thereof, enabling the entire contents of the barrel to be drawn off, which is impossible in the valves of this character heretofore used, inasmuch as the latter projected a considerable distance beyond the inner side of the barrel. At its inner end the valve-body is closed by a head D, having two outlet ports or openings $d\ d$ on opposite sides of its center.

E represents the valve-disk, arranged axially within the inner part of the body and having secured to its inner side or face a packing-disk or washer F, of rubber or similar material, which engages with the outer side of the valve-head D. This valve-disk and packing are pivoted centrally to the inner side of the valve-head by means of a screw $g$, bearing with its head against the outer side of the valve-disk. On opposite sides of said pivot-screw the valve-disk and packing are provided with coinciding ports $e\ f$, which may be moved into and out of register with the ports $d$ in the valve-head D for opening or closing the passage-way of the valve.

H represents laterally-projecting locking or tightening lugs arranged on diametrically opposite sides of the valve-disk and adapted to engage with the inner sides of segmental locking-ribs $h$, arranged circumferentially at the inner end of the bore of the valve-body on opposite sides thereof. The ends of the locking-ribs are separated by intervening spaces or gaps $h'$, which are slightly wider than the locking-lugs H. The valve-disk may be passed into the inner or front part of the body by placing its locking-lugs in line with the gaps between the ends of the locking-ribs, and the valve-disk may also be removed from the body in like manner. By pivotally securing the valve-disk and its packing to the head of the valve-body by a screw from the outer end or side of the valve-body it is possible to renew or repair this valve without removing the body from the barrel, thereby avoiding wearing out the opening in the barrel which receives it and rendering it unnecessary to replace that part of the barrel containing the valve-opening, as is commonly the case when valves are employed which must be entirely removed from the barrel to permit of repairing the same.

After the valve-disk and its packing have been seated against the outer side of the head D and pivotally secured thereto by the screw $g$ the passage-way through the valve may be opened or closed by rotating the valve-disk and packing so that the ports thereof are moved into or out of register with the ports in the head D. The ports of the valve-disk and packing are so arranged that they register with those of the valve-head when the lugs H of the disk are in line with the spaces $h'$ between the locking-ribs. Upon turning the valve-disk and packing for moving their ports out of register with those of the valve-head the lugs of the valve-disk are moved behind or along the inner side of the locking-ribs $h$. The inner or operative sides $i$ of these ribs are inclined, so that when the same are engaged by the lugs H of the valve-disk the latter will be crowded inwardly and caused to press the packing firmly against the outer side of the valve-head and produce a liquid-tight joint between these parts. Stops $j$ are preferably arranged at the highest part of the inclined faces of the locking-ribs $h$ in position to be engaged by the lugs H of the valve-disk when the parts wear unduly and limit the movement of the valve-disk in this direction, so as to prevent disarrangement of the parts. While the valve-disk closes the outlet or passage-way of the valve in this manner, the barrel is in condition to be shipped or transported in the usual manner.

In order to prevent the valve-disk from being opened accidentally by the jarring action to which the barrel is subjected during transportation, one or more detent or locking springs K are provided. Each of these springs is secured at one end to the valve-head opposite one of the locking-ribs and is provided at its free end with a shoulder, nose, or offset portion $k'$, which is adapted to engage against the rear side of one of the locking-lugs when the valve-disk is in its closed position, as represented in Fig. 5. These springs exert sufficient pressure against these lugs to prevent accidental opening of the valve-disk, but yield readily when the valve-disk is turned manually by means of a suitable tool when it is desired to open the valve. By interlocking the valve at its periphery with the body when in its closed position the same is securely held against leakage in its closed position and without straining the screw $g$, which pivotally secures the central part thereof to the valve-head.

L represents the coupling whereby the valve is connected with the discharge-conduit $m$ (shown by dotted lines in Figs. 1 and 2) and whereby the valve-disk is turned for connecting the interior of the barrel with said conduit. This coupling comprises a tubular nozzle $l$, connected with the discharge-conduit $m$, a cylindrical stem $l'$, arranged at the inner end of the nozzle, a pair of locking-lugs $n\ n$, arranged on opposite sides of the stem, and an annular flange $o$, arranged at the junction of the stem and nozzle. At the inner end of the coupling-stem the same is provided with a central recess $p$, which is adapted to receive the head at the outer end of the pivot-screw $g$. On opposite sides of this recess the stem is provided with two coupling sockets or recesses $q\ q$, which are adapted to receive two coupling pins, lugs, or projections $q'\ q'$, arranged on the outer side of the valve-disk on opposite sides of its center.

$r\ r$ represent two passages or ways arranged lengthwise in the stem of the coupling on opposite sides of its center and alternating with the sockets $q$. These passages are connected at their outer ends with the interior of the discharge-nozzle, while their front ends are adapted to register with the ports of the valve-disk when the coupling-stem is inserted in the rear or outer part of the valve-body and its sockets $q$ are engaged with the coupling-pins of the valve-disk. In the bore of the valve-body, at the outer end thereof, the same is provided on diametrically opposite sides with two segmental coupling or locking ribs S S, which are separated at their opposing ends by intervening gaps or spaces $s\ s$. In applying the coupling to the valve-body the same is placed with its locking-lugs $n$ in line with the spaces $s\ s$ and then moved into the outer end of the body until the lugs $n$ are moved inwardly through the spaces between the locking-ribs S S and are arranged transversely out of line therewith. As the coupling-stem is thus inserted in the body of the valve the sockets $q$ at their front ends engage with pins $q'$ of the valve-disk, thereby connecting the valve-disk and stem. Upon now turning the coupling, together with the valve-disk and packing, the ports of the valve-disk and packing and the passage through the valve are opened by bringing the ports of the valve-disk and packing into register with those of the valve-head. While thus turning the coupling and opening the valve the locking-lugs $n$ are moved behind the outer locking-ribs S S and engage with the inclined rear sides $t$ thereof, whereby the coupling is drawn inwardly.

$u$ represents a packing-ring, of rubber or similar material, which is mounted on the coupling-stem and adapted to be compressed between the annular flange $o$ of the coupling and the outer end of the valve-body for producing a tight joint between these parts when the coupling is drawn inwardly by the wedge action of its lugs $n$ against the inclined faces of the locking-ribs S.

For the purpose of detaching the coupling from the barrel the coupling, valve-disk, and packing are first turned in the opposite direction for bringing the locking-lugs $n$ opposite the spaces $s$ between the locking-ribs S to permit of withdrawing the stem from the valve-body. During this reverse or unlocking movement of the coupling the valve-disk coupled therewith is moved into its closed position, whereby its lugs H are engaged with the inner locking-ribs $h$ for producing a tight joint. The rotation of the coupling is preferably effected by means of a laterally-projecting handle $u'$, arranged on its nozzle. The spaces between the inner locking-ribs $h$ are arranged in line with those between the outer locking-ribs S to facilitate the introduction of the valve-disk. The corresponding recesses on one side of the valve-body are preferably somewhat wider than those on the opposite side, and the lugs $n$ and H of the coupling-stem and the valve-disk are of corresponding shape, so as to compel assembling of these parts in a certain way and insure coupling of the same in the proper manner.

It will be observed that the inner sides of the inner and outer locking-ribs incline in opposite directions, as shown in Fig. 5, so that upon turning the coupling and valve-disk for opening the valve leakage is prevented by the tightening action of the locking-lugs of the coupling against the outer locking-ribs, while upon turning the coupling and valve-disk in the opposite direction for closing the valve the valve-disk will be tightened by engagement of its locking-lugs with the inner locking-ribs.

I claim as my invention—

1. A valve comprising a hollow body having a head provided with a port, a rotary valve-disk pivoted on the outer side of said head, a lug arranged on the periphery of said disk, and a detent-spring engaging with said lug, substantially as set forth.

2. A valve comprising a hollow body having a head provided with a port, a rotary valve-disk pivoted on the outer side of said head, two ribs arranged oppositely on the interior of said body and separated at their ends by intervening gaps or spaces and each rib having an inclined inner side, lugs arranged oppositely on the periphery of said disk and adapted to pass through said spaces and engage with the inclined sides of said ribs, and detent-springs secured to said head opposite said ribs and having shoulders adapted to engage with the sides of said lugs, substantially as set forth.

3. A valve comprising a hollow body having a head provided with a port, a valve-disk pivoted on the outer side of said head and provided with a port adapted to register with the port of said head, pins projecting outwardly from said disk on opposite sides of its pivot, and a coupling having a stem constructed to enter said body and having a passage adapted to register with the port of said disk and sockets adapted to receive said pins, a rib arranged on the interior of said body, and a lug arranged on the periphery of said stem and engaging with said rib, substantially as set forth.

4. A valve comprising a hollow body having a head provided with a port, a valve-disk pivoted on the outer side of said head and provided with a port adapted to register with the port of said head, pins projecting outwardly from said disk on opposite sides of its pivot, and a coupling having a stem constructed to enter said body and having a passage adapted to register with the port of said disk and sockets adapted to receive said pins, a rib arranged on the interior of said body, a lug arranged on the periphery of said stem and engaging with said rib, and a packing-ring interposed between a shoulder on the coupling and the outer side of said body, substantially as set forth.

5. A valve comprising a hollow body having a head provided with a port, a rotary valve-disk pivoted on the outer side of said head and having a port adapted to register with the port of said head, a rib arranged on the interior of said body and having an inclined inner side, a lug arranged on said disk and adapted to engage the inclined side of said rib, a rotary coupling having a stem for insertion into said body, means for operatively connecting said stem and disk, another rib arranged on the interior of said body and having an inclined inner side, and a lug arranged on said stem and adapted to engage the inclined side of said last-mentioned rib, the relative arrangement of said lugs and ribs being such that upon turning the coupling and disk in the direction for opening the valve the lug of the stem will engage its companion rib while upon turning these parts in the reverse direction for closing the valve the lug of the disk will engage with its respective rib, substantially as set forth.

6. A valve comprising a hollow body having a head provided with ports, a rotary disk pivoted on the outer side of said head and having ports adapted to register with the ports of said head, two internal ribs arranged on opposite sides of the inner part of said body and having their ends separated by gaps or spaces and their inner sides inclined, lugs arranged on opposite sides of said disk and adapted to pass through said spaces and engage with the inner sides of said ribs upon turning the disk in the direction for opening the valve, a coupling having a stem constructed to enter said body and having passages adapted to connect with said ports, coupling-pins arranged on the outer sides of said disk and adapted to engage with sockets in said stem, two internal ribs arranged on opposite sides of the outer part of said body and having their ends separated by spaces or gaps and their sides inclined, and lugs arranged on opposite sides of the stem and adapted to engage with the inclined sides of the last-mentioned ribs, the spaces between the inner ribs and between the outer ribs being in line and constructed to permit the passage of said lugs and the inner side of the inner ribs being inclined in a direction opposite to that of the corresponding side of the outer ribs, substantially as set forth.

Witness my hand this 14th day of February, 1906.

ROBERT STOCK.

Witnesses:
 THEO. L. POPP,
 E. M. GRAHAM.